June 29, 1926.

R. C. ANGELL 1,590,666

FLEXIBLE SHAFT AND CABLE SUPPORT

Filed July 13, 1923

Inventor
Robert C. Angell,

By Clifton C. Callowell
Attorney

Patented June 29, 1926.

1,590,666

UNITED STATES PATENT OFFICE.

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA.

FLEXIBLE SHAFT AND CABLE SUPPORT.

Application filed July 13, 1923. Serial No. 651,445.

My invention relates particularly to that class of supports that suspend a flexible shaft, cord or cable, such as are employed by dentists, die-sinkers or other artisans, wherein one end of the shaft, cord or cable is connected with a supporting element and the other end is free to carry a hand-piece, tool, plug or the like, which when not in use may be permitted to hang pendent, and is especially directed to the type of such supports that are generally formed of helically-coiled wire and that tend to maintain the uniform continuity of the projected curve of a shaft, cord or cable hanging pendent from a horizontal axial support.

It is well known that the strains tending to cause abrupt permanent bends or sets, which tend to fracture flexible shafts and casings such as are employed on dental engines, or flexible cords or cables such as are used on vacuum cleaners, percolators, flatirons and other implements, are most likely to occur adjacent to the supported end of such shafts, cords or cables, and that it is desirable to protect the same by relieving strains tending to injure them, by means of a reinforcing medium which may preferably be a flexible thimble or sleeve arranged to maintain said shafts, cords or cables, in a curve of substantial radius.

The principal objects of my invention are to provide a simple and efficient reinforcing yielding support for flexible shafts, cords or cables, so constructed and arranged as to gradually decrease in its supporting effect from its supported end outwardly and consequently increase in its flexibility in the same ratio.

Other objects of my invention are to provide a reinforcing sleeve or supporting thimble for flexible shafts, cords or cables, in which the pitch of the helical coil forming the sleeve or thimble gradually approaches normality with respect to the axis thereof toward its free end.

The form of my invention, as hereinafter described, comprises a reinforcing or supporting spring thimble or sleeve for flexible shafts, cords or cables, formed of a helically coiled flat strip of suitable material of uniform thickness, but tapering in width from its supported end outwardly and so proportioned as to develop the required flexibility.

My invention also includes all of the various novel features of construction and arrangement as hereinafter more definitely specified.

Figure 1:
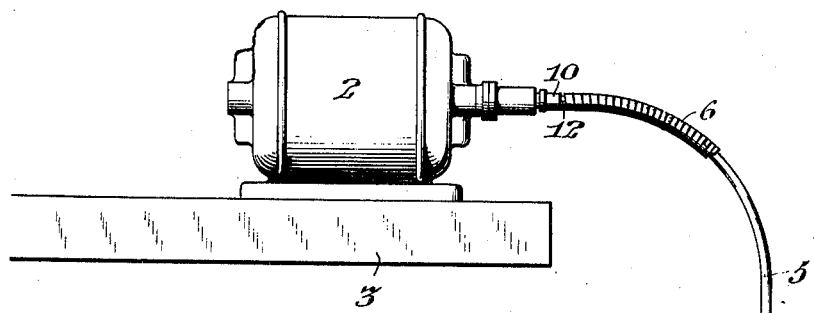
Figure 2:
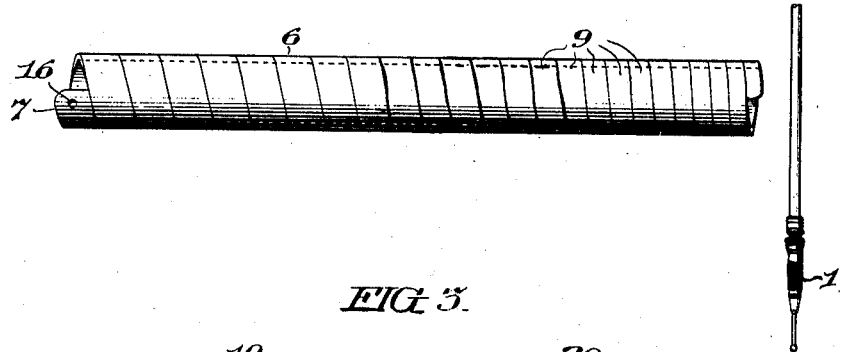
Figure 3:

In the accompanying drawings Figure 1 is a side elevational view of a flexible shaft connecting a typical form of handpiece with an electric motor, and conveniently embodying a reinforcing sleeve constructed in accordance with my invention; Fig. 2 is a side elevational view of the reinforcing sleeve shown in Fig. 1, relatively enlarged; Fig. 3 is a side elevational view of a modified form of the reinforcing sleeve shown in Fig. 2; and Fig. 4 is a plan view of the flat sheet metal strip from which the sleeves shown in Figs. 2 and 3 may be formed.

In said figures the handpiece 1 is connected with the motor 2, or other driving element, on the bench 3, by the flexible shaft whose casing 5 is provided with the reinforcing thimble or sleeve 6, which affords a convenient support for said shaft casing, to maintain it in a substantially parabolic curve with its free end depending as shown in Fig. 1.

Figure 4:
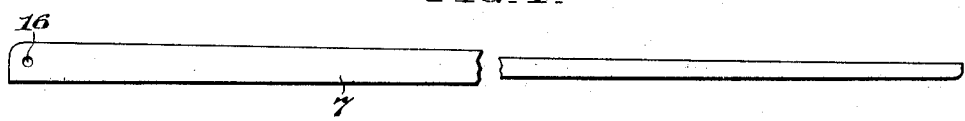

The reinforcing sleeve 6 may preferably be formed of a flat strip 7 of metal or other suitable material, of uniform thickness, tapering in width toward its free end, as shown in Fig. 4, and coiled to form the convolutions 9 of the sleeve 6, as shown in Fig. 2.

The sleeve 6 may be conveniently attached to the ferrule 10 of the shaft casing 5 by the pin 12, which may be extended through a suitably provided aperture 16 in the supported end of the sleeve 6.

It may be here noted that by reason of the tapered strip 7 being closely coiled, the successive convolutions 9, not only decrease in width, but gradually approach normality with respect to the axis of the shaft, and its supporting effect on said shaft decreases outwardly in the same ratio.

However, in the modified form of sleeve 19, shown in Fig. 3, the tapered strip 7 is so coiled that the convolutions 20 follow a uniform helical path, and consequently said convolutions are separated by a space constantly increasing toward the free end of said sleeve.

It will be obvious that a reinforcing sleeve constructed in accordance with my invention affords a substantially rigid or stiff support adjacent to its attachment with its supporting element, such as the motor 2, and that a shaft, cord or cable supported thereby may be held in such a curve as to prevent abrupt bends therein while permitting substantially unrestricted freedom of normal use.

Although I have described the reinforcing sleeves as being formed of flat tapered strips of material suitably coiled to provide reinforcement for the shaft, other forms of tapered strips or tapered wire may be employed to accomplish a similar result, and, therefore, I do not desire to limit my invention to the precise details of construction and arrangement as herein set forth, as it is obvious that various modifications may be made therein without departing from the essential features of my invention as defined in the appended claims.

Having thus described my invention, I claim:

1. A stiffening sleeve for a flexible element, comprising a tube formed of a flat tapered strip helically coiled, so that the flat web of said strip extends in the general direction of the axis of said tube.

2. The combination with a flexible element such as a shaft or cable, of a stiffening sleeve comprising a tapered strip of sheet material helically coiled about said flexible element, with the narrower end of said strip extended away from the attached end of said flexible element.

In witness whereof, I have hereunto set my hand this 22nd day of June, A. D., 1923

ROBERT C. ANGELL.